No. 761,218. PATENTED MAY 31, 1904.
A. J. GILLESPIE.
REGISTER OR COUNTER.
APPLICATION FILED OCT. 5, 1899.
NO MODEL. 3 SHEETS—SHEET 2.
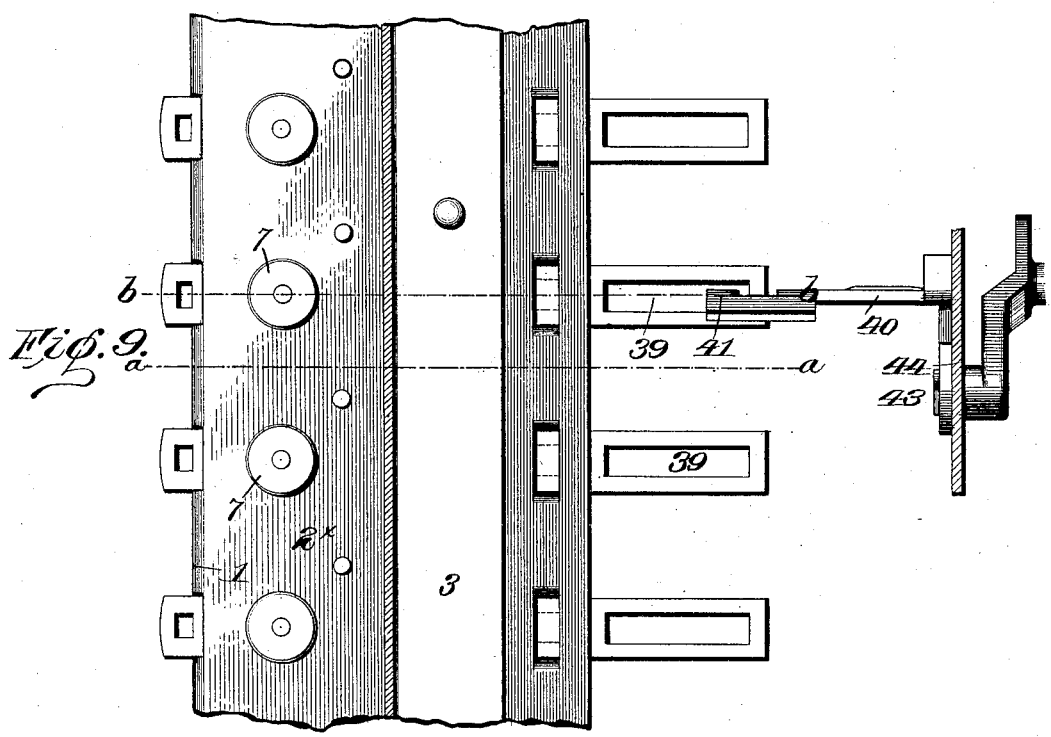
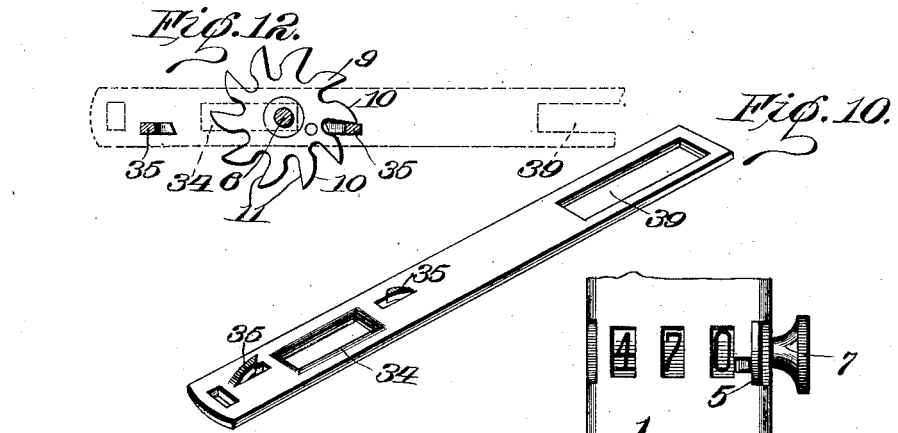
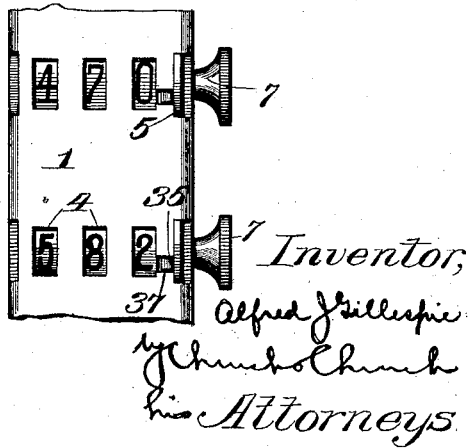
Witnesses:
Walter B. Payne
Thomas Durant
Inventor,
Alfred J. Gillespie
Church & Church
his Attorneys No. 761,218. PATENTED MAY 31, 1904.
A. J. GILLESPIE.
REGISTER OR COUNTER.
APPLICATION FILED OCT. 5, 1899.
NO MODEL.
3 SHEETS—SHEET 3.
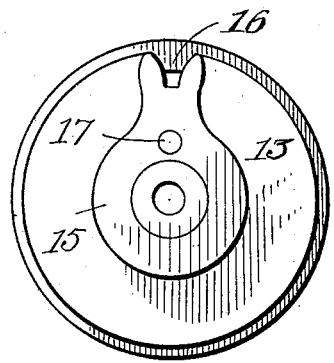
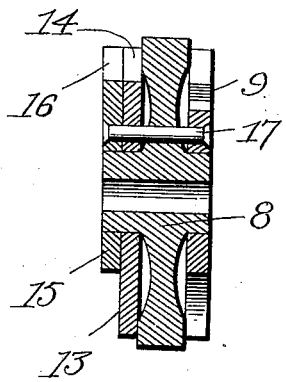
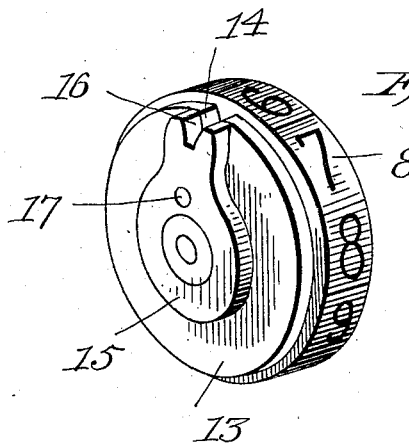
WITNESSES
Thomas Durant
Alexander Stewart
INVENTOR
Alfred J. Gillespie
By Frederick P. Church,
His Attorney No. 761,218. Patented May 31, 1904.

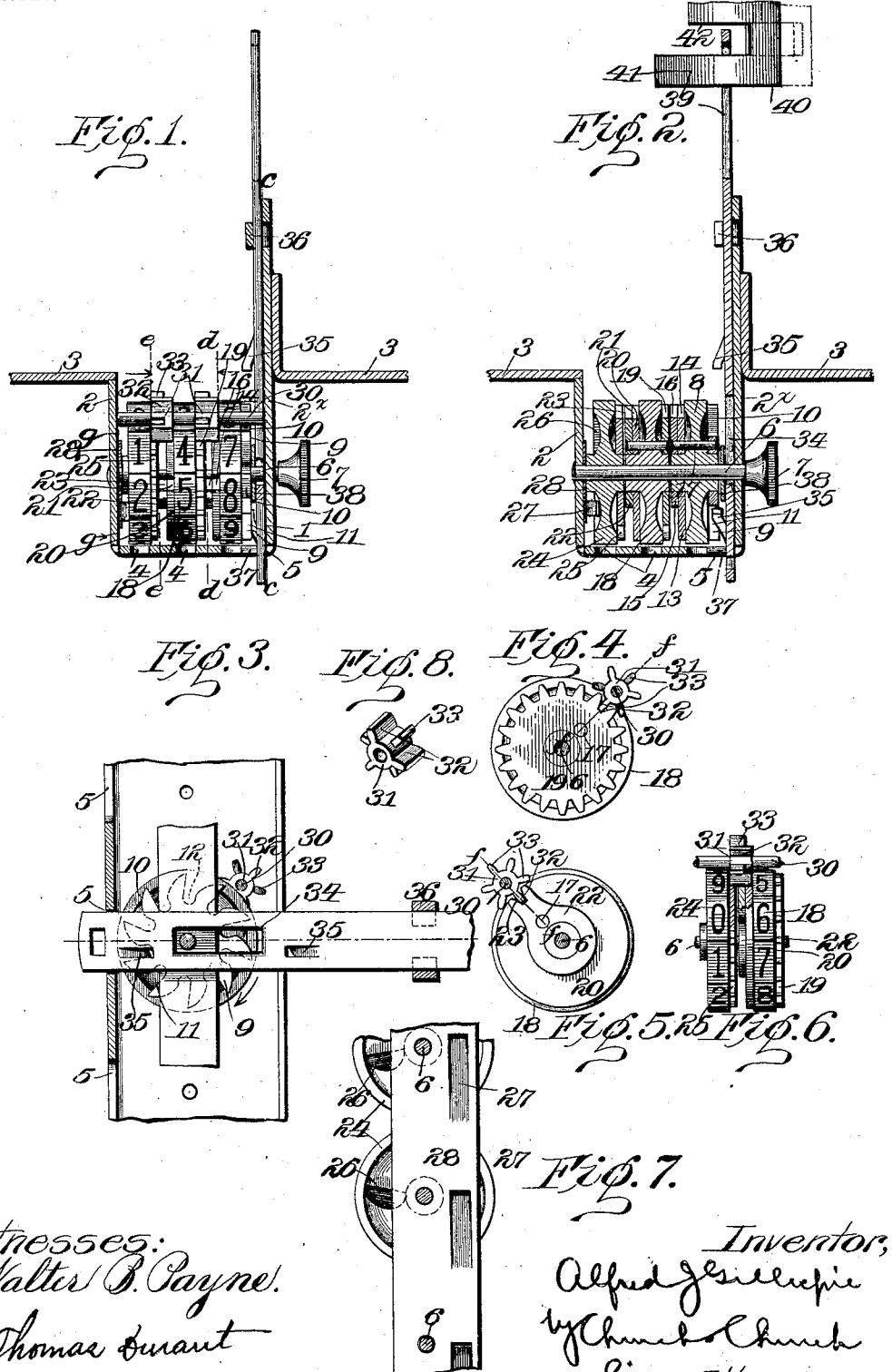

UNITED STATES PATENT OFFICE.

ALFRED J. GILLESPIE, OF ROCHESTER, NEW YORK, ASSIGNOR, BY MESNE ASSIGNMENTS, TO U. S. STANDARD VOTING MACHINE CO., OF ROCHESTER, N. Y., A CORPORATION OF NEW YORK.

REGISTER OR COUNTER.

SPECIFICATION forming part of Letters Patent No. 761,218, dated May 31, 1904.

Application filed October 5, 1899. Serial No. 732,698. (No model.)

*To all whom it may concern:*

Be it known that I, ALFRED J. GILLESPIE, of Rochester, in the county of Monroe and State of New York, have invented certain new and useful Improvements in Registers or Counters; and I do hereby declare the following to be a full, clear, and exact description of the same, reference being had to the accompanying drawings, forming a part of this specification, and to the reference-numerals marked thereon.

My present invention has for its object to provide an improved register or counter adapted particularly for use in voting-machines of the type of that shown in Letters Patent No. 628,792, granted to me July 11, 1899, although capable of use in other connections and for other purposes; and to these ends it consists in the improvements and combinations of parts hereinafter described, the novel features being pointed out in the claims at the end of this specification.

In the accompanying drawings, Figure 1 is a horizontal sectional view taken on the line *a a* of Fig. 9, showing the casing or support for the counter in section with the operating parts; Fig. 2, a horizontal sectional view on the line *b b* of Fig. 9; Fig. 3, a sectional view on the line *c c* of Fig. 1; Fig. 4, a sectional view on the line *d d* of Fig. 1; Fig. 5, a sectional view on the line *e e* of Fig. 1; Fig. 6, a sectional view on the line *f f* of Fig. 5; Fig. 7, a sectional view on the line *g g* of Fig. 1; Fig. 8, a perspective view of one of the pinions; Fig. 9, a side elevation of the casing or support for the counter; Fig. 10, a perspective view of the register-actuator; Fig. 11, a rear view of the counter-casings; Fig. 12, a separate view of the actuating-wheel. Fig. 13 is a side elevation of one of the register-wheels; Fig. 14, a vertical section, and Fig. 15 a perspective view, thereof.

Similar reference-numerals indicate similar parts.

The main casing or frame 1 of the register is preferably composed of a single piece of sheet metal formed into a channel, as shown, embodying the two rearwardly-extending side flanges 2 2$^\times$, the latter being the longer and serving to form a support for the actuator, and also a means for attachment to a suitable frame or support 3, to which the casing is riveted or otherwise secured. The forward portion of the casing 1 is provided with a series of apertures 4 for the inspection of the figures upon the wheels of the register and is also provided with an aperture 5 for the passage of the actuator, as will be described. Extending between the sides of the casing is an arbor or spindle 6, arranged to turn freely therein and having a milled operating-head 7 on one end. Secured rigidly to this arbor or spindle is the units-wheel 8, having figures from zero (0) to nine (9) on its periphery and adapted to be exposed through the aperture 4 and having the hubs or bosses on opposite sides, as shown. Mounted upon the boss at the outer side of this wheel is a toothed actuating-wheel 9, as shown in Fig. 12, one of the faces 10 of the teeth of said wheel being curved or inclined, as shown, and the opposite face 11 being substantially straight and extending slightly tangentially of the wheel center. At the base of the teeth are provided the recesses 12 for the reception of the pallets of the actuator and serving to lock the wheel, as will be presently explained. Secured upon the hub on the opposite side of the units-wheel is a disk 13, having a smooth periphery and provided at one point with a slight recess 14, and outside of this a small plate 15, mounted upon the hub or boss and provided with a recess 16, registering with the recess 14 in the disk, said disks 13 and 15 and the ratchet-wheel 9 being secured to the wheel 8 by a pin 17 passing through them, as shown particularly in Figs. 2 and 5.

18 indicates the tens-wheel of the register, mounted loosely upon the shaft or arbor 6, having figures at its periphery and on the side near the units-wheel provided with the gear-wheel 19 and on its opposite side having the disk or plate 20, with a smooth periphery projecting in close proximity to the surface of the wheel 18 and having at one point a recess 21 and outside of this a plate 22, similar to the plate 15 and provided with a recess 23 at its outer edge adjacent to the recess 21 for the accommodation of one of the teeth of the transmitting-gears.

24 indicates the hundreds-wheel, having a gear 25 on the sides next the tens-wheel and upon its outer side an inclined projection or shoulder 26, adapted to coöperate with a spring-detent for arresting said wheel with the zero thereon in line with the aperture 4 in the casing when the wheel is turned backward, but permitting the wheel to continue its forward motion and make several complete revolutions, if desired. This spring finger or detent is indicated by 27 and is preferably stamped from a sheet of spring metal 28, arranged at the side of the casing and through which the spindle 6 passes, said plate preferably extending vertically in the casing and having fingers coöperating with several of the wheels, inasmuch as I purpose providing several of the registers in a single vertically-extending casing.

By the construction described in which the wheels 8, 18, and 24, bearing the numbers, are formed separate from the operating plates, wheels, and disks, 9, 13, 15, 19, 20, 22, and 25, rigidly attached to them, I am enabled to make the first-mentioned wheels bearing the numbers of light materials—such as wood, celluloid, or aluminium—while the operating parts are made of relatively hard sheet metal, such as brass.

30 indicates an arbor mounted in the sides of the casing extending parallel with the arbor 6 and having loosely-arranged upon it two transferring-gears 31, each provided with alternating laterally-extending long and short teeth 32 and 33, respectively. The transferring-gears are arranged between the units and tens and also between the tens and hundreds wheels or disks, and the ends of the adjacent long teeth normally rest upon the disks 13 and 20 at the sides of the wheels of lower denomination, thus locking the latter during the greater portion of their rotation, while the shorter teeth and also the left end of the long teeth engage with the gears on the adjacent numeral-wheels and with the ends of the plates 15 and 22, which operate as teeth.

When the numeral nine (9) on one of the wheels of lower denomination passes from in front of one of the exposing-apertures, the plate 15 or 22 engages the short teeth of the transfer-wheels, rotates the latter, and moves the next adjacent higher wheel a distance sufficient to expose the next higher numeral, as usual in registers of this general construction. The register-actuator is preferably constructed, as shown in Fig. 10, of a single plate of sheet metal formed with the aperture 34 and the two pallets 35 struck up from it on opposite sides of the aperture and pointed in opposite directions, as shown. The aperture 34 is for the accommodation of the arbor 6 and so that the actuator may reciprocate longitudinally in suitable guides, the guide for the rear end being formed in the present instance by the ears or lugs 36, struck out of the casing-plate 2, and the guide for the forward end being formed by the aperture 5 in the casing-plate through which the actuator passes, a small slot or recess 37 for the passing of the actuator-pallet being formed at the side thereof and communicating with the adjacent aperture 4, as in Figs. 1 and 11.

38 indicates a thin and narrow separating-plate arranged between the actuator and the side of the units-wheels, whereby the longitudinal movements of the former are prevented from affecting the latter, this plate in the present instance extending longitudinally of the casing and performing the same function for the vertical series of registers.

From the above construction of the actuator and units-wheel it will be seen that when the actuator is at the rear in the position shown in Figs. 1, 2, 3, and 9 the outer pallet thereon is in the locking-recess 12 at the base of two of the teeth on the actuating-wheel and movement of the latter is prevented, and when the actuator is moved relatively in the opposite direction the inclined surface of the other pallet thereon will engage the inclined or curved face of the opposite tooth on the wheel and turn the wheel one-twentieth of a revolution, holding it locked in this position, as before and as shown in Fig. 12. The rotation of the wheel is completed by the return of the actuator to normal position, the inclined portion of the outer pallet then engaging the inclined face of the wheel-tooth.

The relative movements of the register and actuator may be caused by any suitable means; but I prefer to employ a device consisting of a plate 40, movable upon a support 44 and embodying a finger 41, normally projecting into a slot 39 in the actuator, and a short abutment 42, adapted to be moved into position to engage the outer end of the actuator. One of these operating devices is employed for each register-actuator, and the support 44 and register-casing are relatively movable toward and from each other, so that when the plate 40 is moved to bring the abutment 42 in line with the end of the actuator, as in full lines in Fig. 2, and then the support 44 and register-casing moved toward each other the palleted wheel of the register will be operated a partial rotation, and when they are separated the finger 41 will move the actuator in the opposite direction, completing the movement of the wheel. Any other suitable means could be employed to operate the actuator, if desired; but the one shown is practical. In the present construction the plate 40 is pivoted at 43 and the finger 41 is curved on an arc struck from the center; but this is immaterial and could be changed, if desired, and the plate 40 could be operated in a horizontal plane.

When it is desired to return the numeral-wheels of the register to normal position with the zeros thereon in line with the apertures 4 in the casing, it is only necessary to place the actuators in central position with both pallets out of the path of the teeth on the actuating-wheel and then by means of the thumb-nut 7 rotate the arbor 6 backward, the gearing between the wheels communicating motion from one to the other until first the hundreds-wheel or the one having the highest denomination is set and arrested by the spring-detent 27 and then the other wheels will be arrested in reverse order with the zeros thereon in line with the openings 4.

By employing sheet material in the construction of the registers, as described, a considerable economy is effected and the parts are lightened and may readily be assembled by unskilled operators.

The registers may be employed with good effect in voting-machines such as shown in my prior patent, in which the support for the plates 40 are held stationary and the register-frames moved toward and from it; but, as stated, the registers may be used in other connections and for other purposes, if desired. The feature of locking the register by the actuator to prevent accidental movement and also the construction by means of which all of the wheels may when desired be reset by the simple reversal of the units-wheel when the actuator is out of engagement therewith are particularly valuable in registers for voting-machines. In the construction shown the palleted wheel 9 is connected directly to the units-wheel of the register; but I do not desire to confine my invention to this construction, as the connection between the two could be more remote, if desired.

I do not claim herein the general construction of the registers and the means for operating them, as this construction is disclosed and claimed in other pending applications, the present invention being limited to the separating-plate between the actuator and ratchet-wheel.

I claim as my invention—

1. In a register, the combination with a toothed actuating-wheel, and a train of numbered wheels connected therewith, of the reciprocatory actuator having the pallets thereon coöperating with the actuating-wheel, and the stationary separating-plate arranged between the actuator and the side of the wheel.

2. The combination with the casing, a plurality of registers therein, each having a toothed actuating-wheel, a plurality of palleted movable actuators, one for each wheel, and a single separating-plate in the casing extending between the actuators and the wheels with which they coöperate.

3. The combination with the casing, an arbor therein, a train of numbered wheels, and a toothed actuating-wheel on the arbor, of an actuator having the pallets and the slot for the passage of the arbor, and the separating-plate arranged between the side of the actuator and toothed wheel, whereby the actuator is held out of frictional engagement with the actuating-wheel.

ALFRED J. GILLESPIE.

Witnesses:
   G. WILLARD RICH,
   GRACE A. RODA.